United States Patent
Sato et al.

(10) Patent No.: US 7,604,791 B2
(45) Date of Patent: Oct. 20, 2009

(54) RECYCLING METHOD SYSTEM AND CONTAINER

(75) Inventors: Kunimichi Sato, Tokyo (JP); Syuji Ueno, Mitaka (JP); Masafumi Yanagihara, Mitaka (JP)

(73) Assignee: Kunimichi Sato, Tokyo (JP)

( * ) Notice: Subject to any disclaimer, the term of this patent is extended or adjusted under 35 U.S.C. 154(b) by 0 days.

(21) Appl. No.: 10/483,853

(22) PCT Filed: Jun. 25, 2003

(86) PCT No.: PCT/JP03/08028

§ 371 (c)(1),
(2), (4) Date: Jan. 14, 2004

(87) PCT Pub. No.: WO2004/011165

PCT Pub. Date: Feb. 5, 2004

(65) Prior Publication Data

US 2004/0235655 A1    Nov. 25, 2004

(30) Foreign Application Priority Data

Jul. 25, 2002 (JP) .............................. 2002-217136

(51) Int. Cl.
C01B 7/01 (2006.01)
(52) U.S. Cl. ...................................... 423/500; 585/242
(58) Field of Classification Search .............. 423/447.3, 423/447.7, 447.8, 447.9, 488, 500; 585/242
See application file for complete search history.

(56) References Cited

U.S. PATENT DOCUMENTS

| 5,541,386 | A | * | 7/1996 | Alvi et al. | ............... | 219/121.38 |
| 5,591,312 | A | * | 1/1997 | Smalley | ................. | 204/157.41 |
| 5,673,635 | A | | 10/1997 | Fowler | | |
| 6,172,275 | B1 | * | 1/2001 | Tadauchi et al. | ............. | 423/481 |
| 6,244,198 | B1 | | 6/2001 | Suominen | | |
| 6,337,302 | B1 | * | 1/2002 | Teng et al. | .................. | 502/432 |

FOREIGN PATENT DOCUMENTS

| GB | 2303859 | | 3/1997 |
| GB | 2303859 | A * | 3/1997 |
| JP | 7-96271 | | 4/1995 |
| JP | 9-125070 | | 5/1997 |
| JP | 10-1679 | | 1/1998 |
| JP | 10-130007 | | 5/1998 |
| JP | 11-158319 | | 6/1999 |
| JP | 2000-319661 | | 11/2000 |
| WO | WO 01/40711 | | 6/2001 |

OTHER PUBLICATIONS esp@cenet—Document Bibliography and Abstract, publication No. JP7096271, publication date Apr. 11, 1995, 1 page.
esp@cenet—Document Bibliography and Abstract, publication No. JP9125070, publication date May 13, 1997, 1 page.
esp@cenet—Document Bibliography and Abstract, publication No. JP10001679, publication date Jan. 6, 1998, 1 pg.
esp@cenet—Document Bibliography and Abstract, publication No. JP1013007, publication date May 19, 1998, 1 page.
esp@cenet—Document Bibliography and Abstract, publication No. JP2000319661, publication date Nov. 21, 2000, 1 page.
European Patent Office supplementary European search report for European patent application No. 03 73 6245 and PCT/JP0308028, dated Oct. 25, 2005, 3 pages.
Japanese Office Action issued in JP Application No. 2004-524102, dated Mar. 20, 2007 and the English translation thereof (7 pages).

* cited by examiner

*Primary Examiner*—Stuart Hendrickson
(74) *Attorney, Agent, or Firm*—Osha • Liang LLP

(57) ABSTRACT

Nitrogen is fed into a sealed container (18) to expel oxygen (step 1) and, in such a state, the inside temperature of the container (18) is incrementally raised step by a heater built into the container (18). In sequential steps 2 through 5, Water content, chlorine, and high-molecular gases are extracted. Reusable carbon and metal remain in the container (18) in step 6, or when left standing for a prescribed time or more. Gases extracted in steps 2 to 5 can be liquefied for recycling. No carbon dioxide or dioxins are produced because heating is performed in an oxygen-free atmosphere. A furnace is not required because the heater is installed in the container (18), and treatment efficiency is high. A space-saving, energy-efficient, and low-cost treatment system, by which carbon (e.g., inert carbon), metals, and the like can be recovered in a reusable state without producing carbon dioxide or dioxins, is obtained. The obtained inert carbon can be subjected to an activation treatment to continuously mass-produce carbon nanotubes and activated carbon.

5 Claims, 5 Drawing Sheets

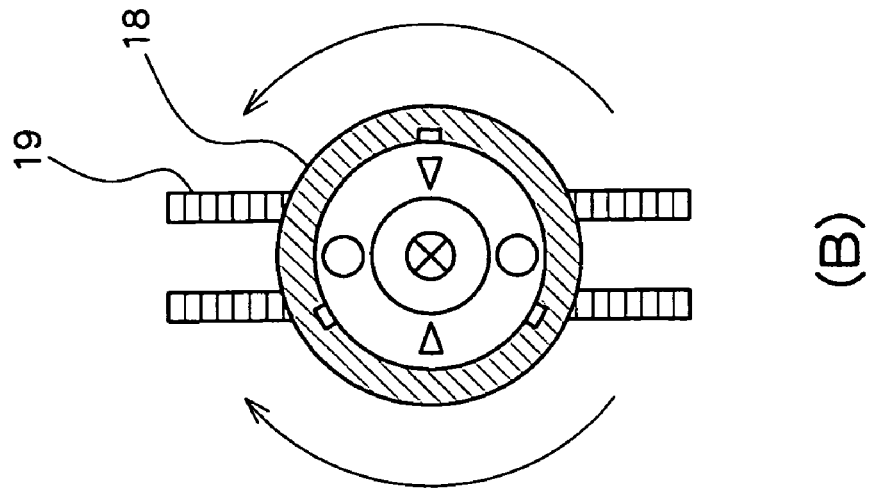
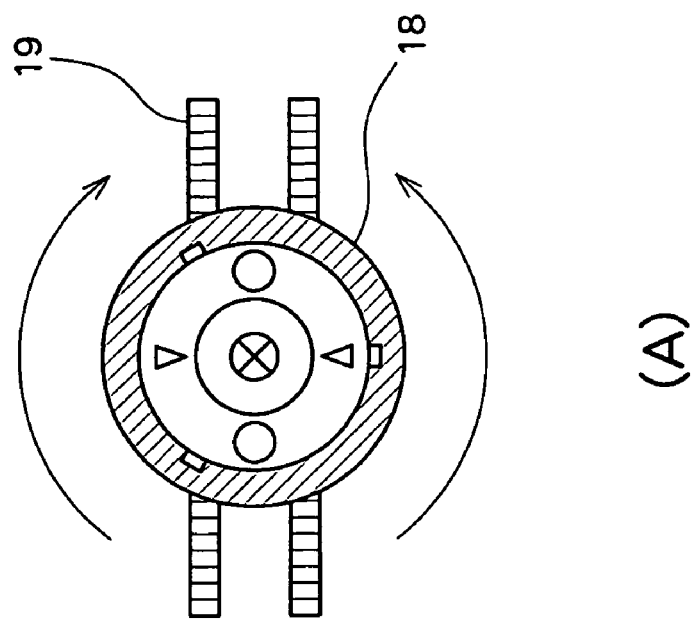
Fig. 4

RECYCLING METHOD SYSTEM AND CONTAINER

TECHNICAL FIELD

The present invention relates to a recycling method and system for waste or the like, a method and system of producing carbon materials such as inert carbon, carbon nanotubes, and activated carbon by utilizing such waste, and a suitable container for such methods and systems.

BACKGROUND ART

Waste disposal has in recent years focused to an ever greater extent on the recycling of wastes to produce usable materials. The recycling concept is being gradually realized through segregated disposal of waste and the like. However satisfactory results have not yet been obtained yet because of strict social and economic restrictions related to labor, facilities, cost and other factors related to the requirements for segregated disposal.

There is a growing demand for inhibiting, over the social life, human activities which result in deterioration of the global environment. An especially significant issue in connection with waste disposal is how to suppress the emission and dissipation of carbon dioxide, dioxins, nitrogen oxide (NOx), sulfur oxide (SOx), soot, heavy metal sand the like produced in the process of incinerating or otherwise treating waste. For example, carbon dioxide produced when carbon-containing wastes are incinerated is though to contribute to the greenhouse effect, and elaborate efforts are made in attempts to control their emission into the atmosphere. Incineration of chlorine-containing waste additionally produces a substance group having high toxicity which are generally collectively referred to as dioxins. Under the present circumstances, the emission into the air can be controlled for some extent by incinerating at an adequately high temperature, keeping a constant incineration temperature, using a reburning device, or the like, but further suppression of the emission of dioxins still remains as a problem to be solved.

Therefore, a near-future waste disposal system must be a system which can reproduce a large volume of useful resources from waste and be built and operated without involving much time and labor, large facilities, or high cost, and is environmentally friendly without producing or releasing carbon dioxide or dioxins. The system described in Japanese Patent No. 2651994, for example, is an example known system which can partly respond to such social demands. The disclosed system produces activated carbon from scrap tires by heating the scrap tires in a nitrogen atmosphere not containing oxygen. This system does not produce carbon dioxide because the scrap tires being heated are kept isolated from oxygen and metals such as steel wire and the like contained in the waste tires can be recovered in a non-degraded reusable state. The disclosed system is a related to the recycling of scrap tires, and does not release carbon dioxide or the like.

This patented system, however, has a furnace called a carbonization chamber or the like as its basic configuration unit, generally requires installation of many chambers or furnaces including a plurality of carbonization chambers and their incidental reserve chambers or the like, and these chambers or furnaces must be provided in a sealable configuration which avoids all contact with the air. Therefore, it is facility scale (dimensions and weight), operation costs (power and thermal power costs and labor costs), and the like are all disadvantageously great.

Such a system can produce activated carbon by treating waste, but requires that the waste be treated in an oxygen-free state so as to change the activated carbon into inert carbon in order to obtain inert carbon. The inert carbon (e.g., bincho charcoal) has substantially no pores and a high carbon density and provides a high volume of far infrared ray radiated from carbon elements as compared with activated carbon having many pores and a low carbon density. Thus, the inert carbon is useful for applications employing far infrared radiation (e.g., a method of using it as the content of an infrared pillow, a method of using it as the contents of infrared concrete, etc.). The inert carbon is also useful because carbon nanotubes and the like can be produced by activating the inert carbon. Accordingly, there is great demand for a system which can mass-produce inert carbon by directly obtaining the inert carbon.

DISCLOSURE OF THE INVENTION

According to one aspect of the present invention, the present invention advantageously provides a recycling method and system capable of recycling waste efficiently in small-scale facilities at a low cost using a method which does not release excess or toxic emissions.

According to another aspect of the present invention, the present invention also advantageously provides a carbon material manufacturing method and system capable of obtaining inert carbon by recycling high-molecular compounds.

According to another aspect of the present invention, the present invention further advantageously provides a carbon material manufacturing method and system which produce useful carbon materials such as carbon nanotubes (as used in this specification, "carbon nanotubes" broadly refers collectively to single-layer carbon nanotubes, multilayer carbon nanotubes, carbon nanohorns, and the like), quality activated carbon, and the like from inert carbon, from high-molecular compounds at low cost and in large quantities through continuous production.

According to another aspect of the present invention, the present invention also advantageously provides a container which can be used with the above-described recycling method and system, and carbon material manufacturing method and system.

To attain the above advantages, for the recycling method and system of the present invention, a container with a built-in heater is used to perform the recycling method in an oxygen-free atmosphere (indicating a general idea of a nitrogen atmosphere, an inert gas atmosphere or the like in this specification). Specifically, the present invention realizes and achieves the effects, which cannot be obtained by heretofore known systems, including reduction in facility scale, cost reduction, improved recycling efficiency, and the like, by changing a unit of treating objects such as scrap tires, rubber, vinyl, plastic, and other petroleum- and resin-based high-molecular compounds from a furnace to a container having a built-in heater while maintaining the various advantages possessed by the preferable systems which treat and incinerate the object waste for disposal. The present invention can be applied to a system which is not only for waste disposal but also for separation of a target substance from an object to be treated, and particularly to systems in general which need to obtain the target substance in a state not oxidized, such as inert carbon. When it is assumed that the object is a high-molecular compound and inert carbon is obtained as a result, carbon materials such as carbon nanotubes and activated carbon can be obtained by an activation treatment to oxidize inert carbon with high-temperature gas (steam, carbon dioxide) or the like.

Another system of the present invention can produce a large amount of carbon materials such as carbon nanotubes and activated carbon at a low cost by the activation treatment of the obtained inert carbon by continuous production.

A recycling method according to the present invention has a first step of replacing the atmosphere in a container containing an object to be treated, such as waste, with an oxygen-free atmosphere (e.g., nitrogen atmosphere); a second step of heating the object in the container to a prescribed temperature by a heater built into the container while maintaining the oxygen-free atmosphere in the container to liberate a prescribed gas from the object and guiding the liberated gas as a first product to an outside device of the container while maintaining the first product in a state isolated from the air to obtain the first product in a fluid state; and a third step of cooling the inside of the container to a temperature lower than a temperature at which carbon starts to burn while continuously maintaining the oxygen-free atmosphere in the container and obtaining a residue remaining in the container as a second product. Preferably, the second step is performed two or more times; a heating temperature of the object in each of the plurality of second steps is determined so that a heating temperature in a subsequent second step is higher than that in a preceding second step and also according to a kind of gas to be liberated as the first product in that step; and a guiding route and a guided destination for acquisition of the first product are separately determined for each of the plurality of second steps. For example, the second step performs at least any of a step of obtaining water as the first product, a step of obtaining a fluid containing chlorine as the first product, and a step of obtaining a high-molecular gas or a fluid produced from the high-molecular gas as the first product.

In preferable embodiments of the invention, various types of pipelines are used for feeding, guiding, and otherwise manipulating gas. For example, the first step may be performed with a first device for feeding at least a reducing gas or an inert gas connected to the container through a first pipeline; the second step may be performed with the first device connected to the container through the first pipeline and a second device as an outside device of the container connected to the container through a second pipeline; and the container may be sealed when it is necessary to disconnect the pipeline between the container and the first or second device in order to move from one step to the next step. And, as one of preferable system configurations, a different implementation place or location may be determined for each step, and a pipeline required for implementation of each step at the individual implementation locations extended to the implementation place so as to allow simultaneous treatment of a plurality of containers in an "assembly-line" method by sequentially moving the containers from a preceding step to a following step. As another preferable system configuration, the implementation places or locations of the individual steps are determined to be a common place to enable the performance of at least the first and second steps without moving the container, and all pipelines required for implementation of the first and second steps are extended to the pertinent place. The recycling system according to the invention is preferably provided with the first device, the second device, the first pipeline and the second pipeline.

The method of manufacturing a carbon material for inert carbon according to the present invention for the above-described recycling method may have a high-molecular compound as the object and produces inert carbon as the second product.

In a method of manufacturing a carbon material for carbon nanotubes and activated carbon according to the present invention, the obtained activated carbon may be activated with high-temperature steam or the like to obtain carbon nanotubes and activated carbon.

The container according to the invention is a transportable container provided with a heater. The container used for implementation of the recycling method of the invention may be formed to have a covered opening for charging an object to be treated and removing the second product, an inlet to which the first pipeline is connected and an outlet to which the second pipeline is connected and may further be provided with transport assisting structures such as wheels, handles, races or a flat surface used to move the container, and a heater built in the container to heat the object in the container.

The recycling method and carbon material manufacturing method of the invention can be provided as a similar recycling system and carbon material manufacturing system.

BRIEF DESCRIPTION OF THE DRAWINGS

FIG. 4 is a diagram showing a method of removing the container, and particularly (A) shows a state of the container on a treating line, and (B) shows the container turned and ready to be removed.

BEST MODE FOR CARRYING OUT THE INVENTION

A preferred embodiment of the present invention will be described with reference to the accompanying drawings. For clarity of description, examples of applying the present invention to waste treatment will be described below. Waste which can be treated by the method and system of the invention include, for example, various types of industrial and general waste, such as rubber, vinyl, plastic and other petroleum- and resin-based high-molecular compounds, medical wastes, agricultural wastes, car shredder dust, tires (scrap tires etc.), computers, mobile phones, chlorine compounds, sludge, and the like. Characteristics of the present invention include the ability to treat waste containing various chemical components; the ability to treat almost all waste without presorting; convenient and power-saving facilities which can treat various types of waste at a low cost; substantially no emission of carbon dioxide, dioxins, nitrogen oxide, sulfur oxide, soot, or heavy metals, and a wide variety of applications (other than in waste treatment including, for example general extraction of non-oxidized substances, and the like.

Figure 1:
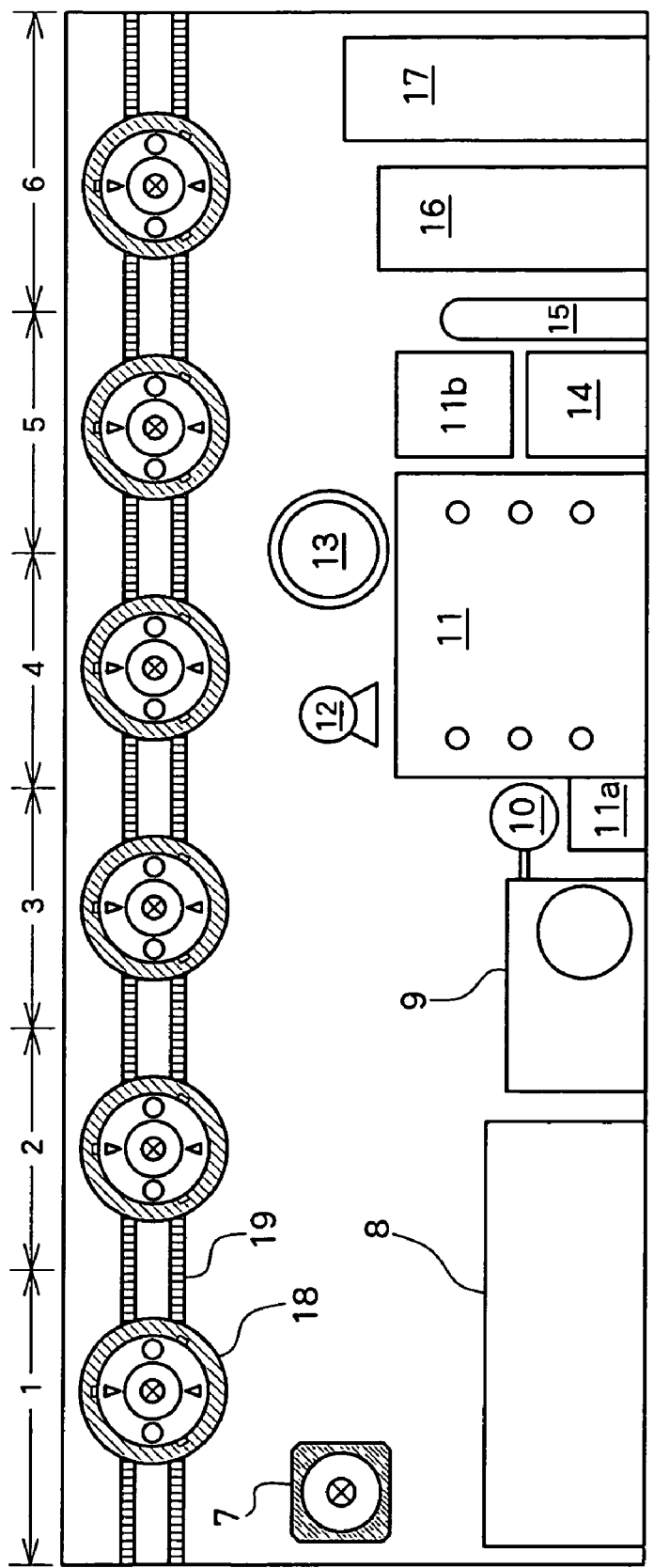
FIG. 1 is a conceptual top view showing a structure of the recycling system according to one embodiment of the invention, and particularly an outline of the treating line and its incidental equipment.
Figure 2:
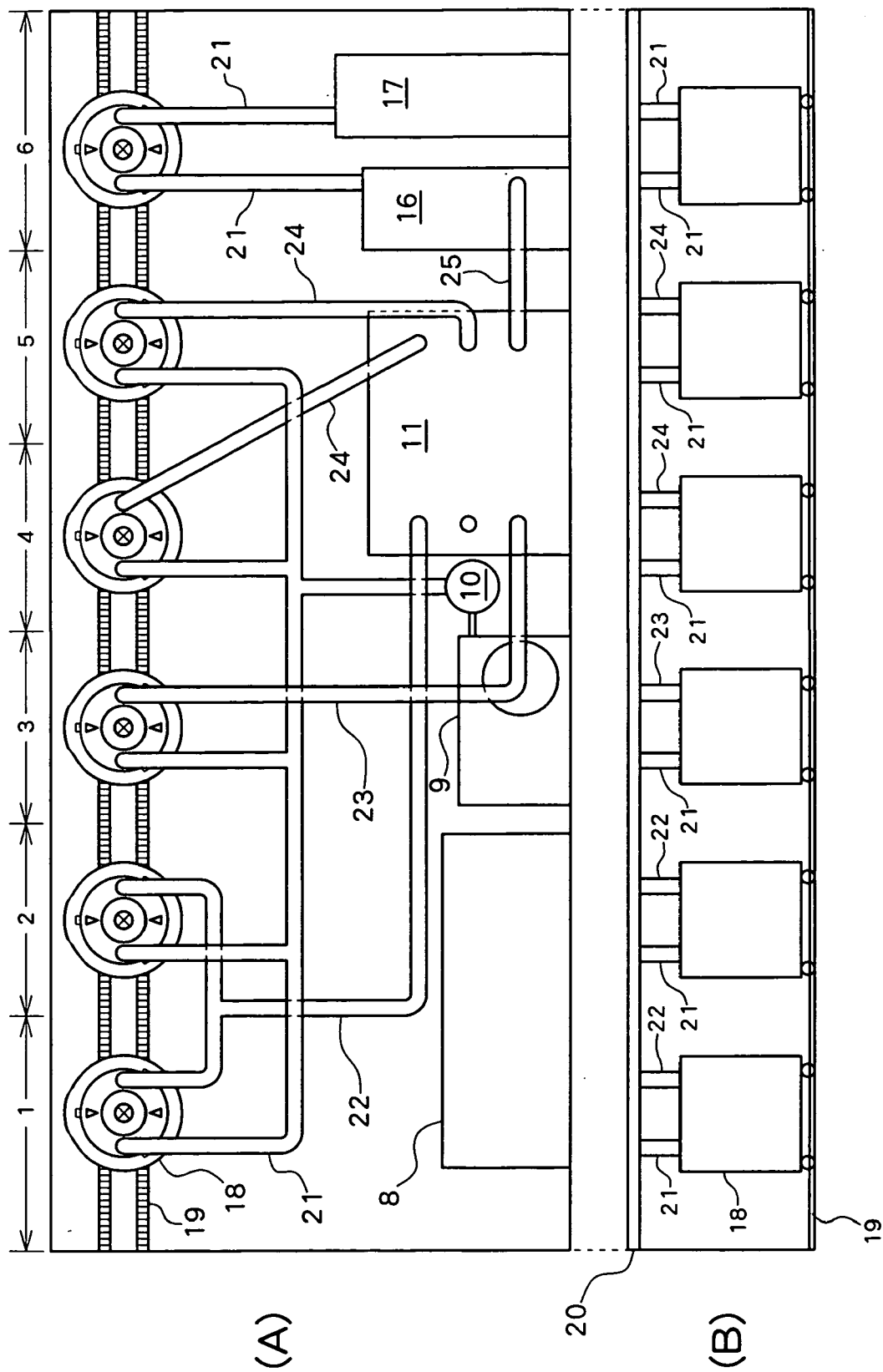
FIG. 2 shows a schematic diagram of a conduit arrangement of the embodiment, and particularly (A) is a top view and (B) is a side view.
Figure 3:
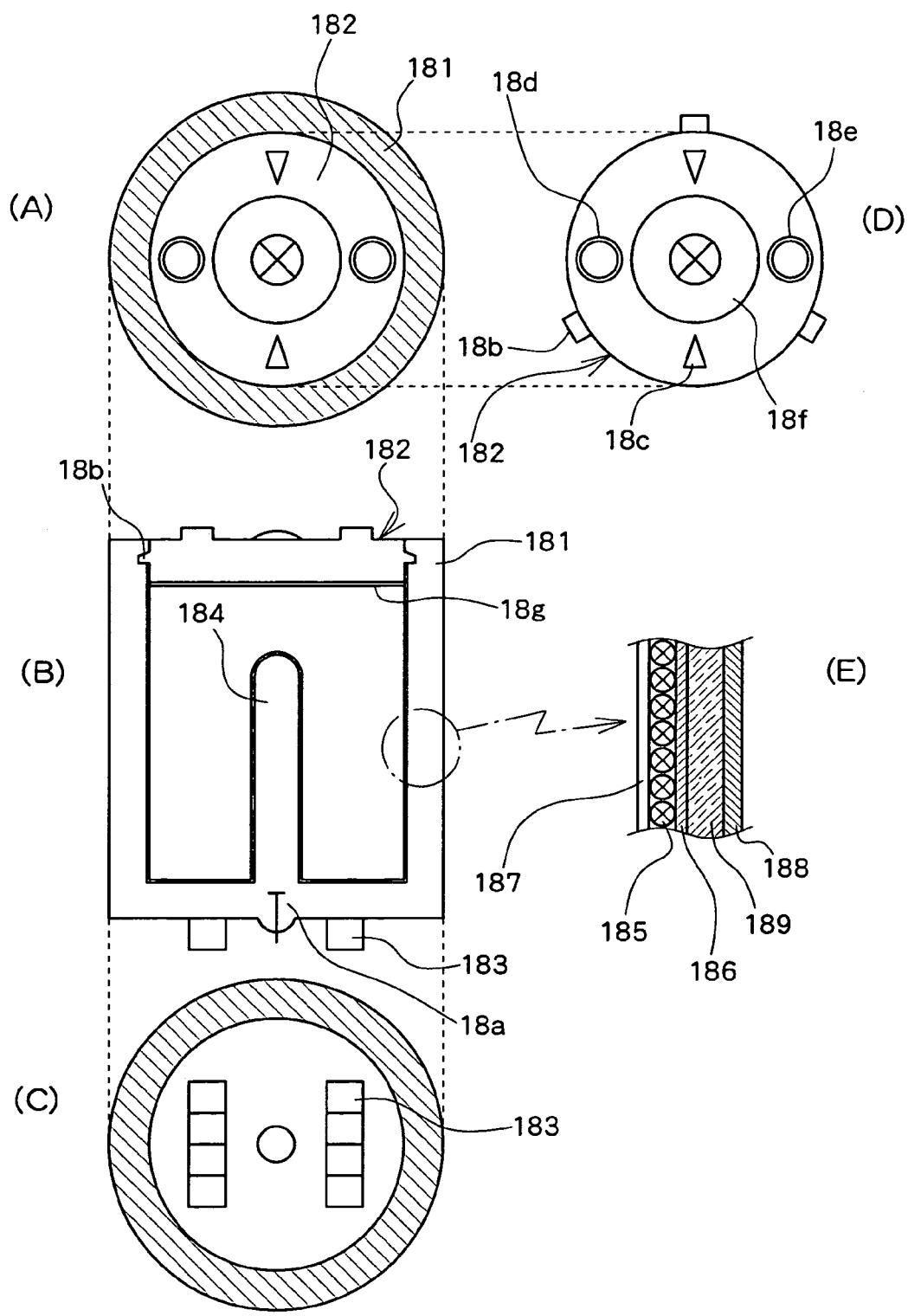
FIG. 3 is a diagram showing an example structure of the container of the embodiment, and particularly (A) is a top view, (B) is a vertical sectional view, (C) is a bottom view, (D) is a top view of the lid, and (E) is an enlarged sectional view of a portion in which a heater is incorporated.

The outline of an example treating line and incidental equipment of the recycling system according to this embodiment of the invention is shown in FIG. 1, the outline of a conduit arrangement is shown in FIG. 2, an example structure of a container is shown in FIG. 3, and a method of removing the container from the treatment line is shown in FIG. 4. This system does not comprise a furnace, but does include a container 18, which is transportable and provided with a heater, as a basic unit along the treating line.

The recycling process performed by the system according to this example is a process to treat multiple containers 18 in parallel by passing the containers 18 in order of steps 1 to 6 as shown in FIG. 1 and FIG. 2. Among the steps 1 to 6, step 1 corresponds to the above-described first step, steps 2 to 5 correspond to the above-described second step, and step 6 corresponds to the above-described third step. Among the pipelines in the pipe arrangement 20 as shown in FIG. 2; nitrogen pipes 21 correspond to the above-described first pipeline; and an oxygen/moisture conduit 22, a chlorine/miscellaneous gas conduit 23, and miscellaneous gas pipes 24 correspond to the second pipeline. The individual pipelines are separately disposed according to gas type such that gas supply/recovery can be performed separately according to gas type, and such that the gas in each pipeline does not come into contact with the outside air. In this example, waste containing water, chlorine, and high-molecular compounds other than carbon and metal correspond to the above-described object to be treated, a substance group extracted through the pipeline in steps 2 to 5 corresponds to the above-described first product, and a substance group remaining in the container 18 after step 6 is completed corresponds to the above-described second product.

The container 18 is comprised of a cylindrical bottomed box container body 181 and a lid 182 as shown in FIG. 3. Specifically, the top of the container body 181 has an opening for inserting the object waste into the container 18 and for removing the second product from the container 18. The lid 182 is also used to close the opening and provide the container 18 with an airtight seal. As shown in FIGS. 3(B) and 3(C), wheels 183 are disposed as transport assisting members on the bottom face of the container body 181 to make the container 18 transportable. The wheels 183 can be used to move the container 18 along a track 19 shown in FIG. 1 and FIG. 2, to bring in the container 18 onto the track 19 and to take out the container 18 from the track 19, and to remove the container 18 from the track 19 by partly turning the track 19, in the event of a failure or the like as shown in FIG. 4. The wheels 183 are, of course, just one example of transport assisting structures that can be provided to ease movement of the container 18. In another example, handles or races may be disposed instead of or together with the wheels 183 to perform the same function. When the handles are mounted on the top or the side of the container 18, the container 18 can be hoisted for transportation by human or machine power, and when the races are formed on the bottom face of the container 18, the container 18 can be lifted for transportation by a fork lift truck or the like. The container 18 can be configured to have a flat bottom surface so that it may be conveyed by a conveyor belt. In practice, the container body may have a form other than a cylindrical bottomed box type as suits the waste to be treated. For example, the container body may have a rectangular bottomed box shape with a side-opening lid. The rectangular bottomed box container body with a side-opening lid has an advantage that the container can be inserted with waste by working on the container rails without lifting.

A heater 185 is incorporated into the side wall, bottom, and a pole 184 installed upright on the bottom of the container body 181. An example of a heater built into the side wall is shown in FIG. 3(E). The container body 181 has a structure in which the heater 185, which may be, for example, an infrared carbon ceramic heater or a carbon filament heater, is mounted on the inside surface of a metallic member 186 made of iron or a similar metal. A protective net 187 prevents the heater 185 from falling by pressing the heater 185 against the inside surface of the metallic member 186. The protective net 187 can also prevent the heater 185 from being soiled by direct contact with the object. Additionally, an insulating material 189 is disposed between the outside surface of the metallic member 186 and an externally positioned exterior material 188. Thus, because heat can be prevented from escaping from the container 18, to the object can be efficiently heated, and it handling of the container 18 when it is moved from one step to the next step is simplified. Further, a plurality of poles 184 may be provided in appropriate numbers and positions considering the volume of the container body 181 and the like, to ensure uniform heating of all contents of the container body 181. Wiring for supplying the heater 185 with power is not shown because appropriate wiring can be designed by an engineer or one skilled in the art according to the disclosure of the present application. The heater 185 is not limited to configurations in which it is disposed along the entire wall surface and the overall height. For example, an upper limit line of the filled amount of the object may be set slightly above the top of the pole 184 and slightly below the bottom surface of the lid 182, and the heater 185 may be disposed just below the line. In the drawings, 18a indicates a power switch for the heater 185, which may be, for example, incorporated into the container body 181 to activate the supply of electricity to the heater 185 when the container 18 reaches a prescribed position on the track 19.

The lid 182 is attached to the opening of the container body 181 to separate the contents of the container 18 from the outside air while performing the steps 1 to 6 shown in FIG. 1 and FIG. 2. The lid 182 is designed to have dimensions matching the dimensions of the opening of the container body 181 so that the container 18 will have an airtight seal when the lid 182 is fitted to the top opening of the container body 181. As shown in FIG. 3(D), a small number (three in the drawing) of projections are formed on the edge of the lid 182 as fixing parts 18b for fixing the lid 182 to the opening of the container body 181. When the lid is installed, the fixing parts 18b engage with recesses formed in the inside wall of the opening of the container 181 to fix the lid 182 to the container body 181 as shown in FIG. 3(B). As shown in FIGS. 3(A) and (D), a small number (two in the drawing) handles 18c are formed on the top surface of the lid 182 so that the lid 182 can be detached from the container body 181, either manually or by use of a lid fitting device 7 of FIG. 1.

In the lid 182 is also formed an inlet 18d for introducing nitrogen into the container 18 when it is in a sealed state and an outlet 18e for discharging gases discharged from the contents during heating and the atmosphere expelled from the airtight container 18 by the introduction of nitrogen. The inlet 18d and the outlet 18e may alternatively be formed in the container body 181. In steps 1 to 6, the first and second pipelines are respectively connected to the inlet 18d and the outlet 18e. The inlet 18d and the outlet 18e are provided with an appropriate lid or valve (each pipeline is also provided with a lid or a valve in the same manner), so that, when the container 18 is moved from one step to the next step, it is possible to maintain the container 18 in a sealed state even when the pipelines are disconnected from the container 18, to thereby prevent air from entering the container 18 and to prevent gas, such as chlorine, from leaking from the container 18 when the container 18 is separated from the pipelines. The lid 182 may also be provided with a microwave generator which can be used for dehydration or the like of raw waste or the like in step 2 and an auxiliary machine mounting section 18f for mounting various types of electrical auxiliary machines. Sensors or probes, such as a temperature sensor and a pressure sensor, used to control heating by the heater 185 and to control the individual steps can also be incorporated into the lid 182 or the individual pipelines. Wiring for control, such as wiring within and around the container 182 and also wiring relevant to an electrical control panel 8 to be described later are not shown. Such wiring can be designed by any engineer or anyone skilled in the art according to the disclosure of the present application. The bottom face of the lid 182 is provided with a filter 18g to prevent an unnecessary matter from adhering to the sensors/probes and the unnecessary matter from being discharged through the outlet 18e or the like as shown in FIG. 3 (B) Recycling by heating in an oxygen-free atmosphere is performed in steps 1 to 6. Step 1 is a step to replace the atmosphere in the container 18 with an oxygen-free atmosphere by injecting nitrogen into the container. This process is performed in a state with the heater 185 off, in other words, in a state wherein the temperature within the container 18 is room temperature or a normal temperature. In step 1, the nitrogen conduit 21 is connected to the inlet 18d of the airtight container 18 in which waste has been place, and the oxygen/vapor conduit 22 is connected to the outlet 18e, so that there is no connection with the air outside of the container 18. A nitrogen gas generating device 9 is a device to generate nitrogen under control by the electrical control panel 8 and is provided with a compressor 10 for compressing the gas. The nitrogen gas generating device 9 extracts nitrogen from the compressed air and delivers it to the nitrogen conduit 21. Naturally, another reducing or inert gas may be used instead of nitrogen. However, nitrogen is advantageous because it can be produced at a low cost by extraction from the atmosphere, and because it causes relatively very little damage. Nitrogen delivered into the nitrogen conduit 21 enters the container 18 through the inlet 18d. The existing gas, e.g., the air, contained in the container 18 is expelled from the container 18 through the outlet 18e and delivered to the oxygen/vapor conduit 22. Step 1 is continued until the concentration of oxygen in the container 18 falls below a prescribed concentration, or until after elapse of an amount of time sufficient to accomplish such a drop in oxygen concentration. After step 1 has been completed, the nitrogen conduit 21 is separated from the inlet 18d, and the oxygen/vapor conduit 22 is separated from the outlet 18e. The inlet 18d and the outlet 18e are closed to maintain the airtight state of the container 18, as described above, until they are connected again to the pipelines in step 2. The same process is also applied when the container is moved between other steps.

Before injection of nitrogen is started, it is necessary to insert the object waste into the container body 181, place the container 18 on the track 19 so that it can be moved to the implementation position of step 1, and to seal the container 18 by fitting the lid 182 to the opening of the container body 181. The order and details of the operations can be determined as required. For example, a procedure in which an empty container 18 which is covered with the lid 182 is brought in, the lid 182 is removed to fill the container, and the lid 182 is then replaced may be performed. Alternatively, a procedure in which the container body 181 is first provided without the lid 182, and the container is sealed with lid 182 after the container has been filled with waste may be employed. Still alternatively, the container body 181 already filled with waste may be provided such that only installation of the lid 182 is required may also be used. The operations to fill the container and seal it with the lid 182 can be performed in an ordinary atmosphere, or a method by which the air is discharged from the container 18 to depressurize it and nitrogen is introduced into the container 18 can also be employed. The lid mounting device 7 of FIG. 1 is a device for attaching and removing the lid 182 on the track 19 in response to an operation. It is desirable to provide a crushing machine or the like (not shown) for use when the object waste is excessively large in comparison with the size of the container 18.

The container 18 having its inside atmosphere replaced with an oxygen-free atmosphere step 1 is moved to the implementation position of step 2. In step 2, the nitrogen conduit 21 is connected to the inlet 18d, the oxygen/vapor conduit 22 is connected to the outlet 18e, and the heater 185 is turned on. The supply of electricity to the heater 185 in step 2 is controlled so as to provide a temperature of 150° C. for a period of time sufficient to substantially complete extraction of the water content of the waste. This control may be made autonomously in the container 18 while receiving feedback from the temperature sensor within the container 18, or while sequentially monitoring output of the temperature sensor by the electrical control panel 8. In the above step, the object is heated to the boiling point of water in the container 18 to vaporize the water content from the waste. A microwave generator or the like maybe incorporated into the auxiliary machine mounting section 18f for use in conjunction with the heater 185 so as to promote the vaporization of water. The vaporized water content, namely water vapor liberated from the object, is expelled into the oxygen/vapor conduit 22 as the inside pressure of the container 18 increases with the vaporization or as nitrogen is introduced through the nitrogen conduit 21. Therefore, gas containing the water content, oxygen, nitrogen and the like is delivered to the oxygen/vapor conduit 22. This gas has the same components as the normal atmosphere, but with the ratio of nitrogen increased and an increased water content. As such, emission to the atmosphere of this untreated gas has no negative effect on the environment. However, because the recovered gas contains recyclable components as well as usable heat, it is preferable to recover and cool the gas sent to the oxygen conduit 22 for reuse, using, for example, a gas cooling device 11 used as a heat exchanger. In FIG. 1, 12 is a water tank belonging to the heat exchanger, and 13 is a cooling tower.

After the inside of the container 18 is dried in step 2, the process moves to step 3 to liberate chlorine for extraction. First, the container 18 is moved to the implementation position of step 3, the nitrogen conduit 21 is connected to the inlet 18d, and the chlorine/miscellaneous gas conduit 23 is connected to the outlet 18e. In step 3, the heating temperature is controlled to a temperature of about 200° C. to 350° C., the temperature at which chlorine is vaporized and liberated from the object but high-molecular gas is not decomposed by heat, using the heater 185, and this temperature is maintained until all or substantially all chlorine has been extracted. Because the container 18 has an oxygen-free atmosphere and no internal combustion, and the chlorine/miscellaneous gas conduit 23 is not open to the atmosphere, harmful dioxins and the like are not produced from the liberated chlorine. Gas which contains chlorine and various miscellaneous gases liberated from the waste is delivered to the chlorine/miscellaneous gas conduit 23 and recovered and cooled by the gas cooling device 11. The resulting liquid (e.g., chlorine ion water) can be stored in a liquid tank 11a. Gas which could not be liquefied by the gas cooling device 11, is neutralized by, for example, a demineralizer 11b using sodium hydroxide so to convert to a liquid mainly containing salt water. A very small amount of gas (e.g., ethanol-based gas usually existing in the natural world) is rendered harmless by means of a neutralizing machine using slaked lime or the like. A device for separating components according to mass differences may also be used as the demineralizer. Gas having passed through the demineralizer 11b, e.g., miscellaneous gas, can be compressed using, for example, a compressor 14, and stored in a cylinder 15. The miscellaneous gas does not contain chlorine, and no dioxins will be produced, even if it the gas is burned by a burner or the like.

Step 3 is followed by step 4 for extracting hydrocarbon-based high-molecular compounds by vaporizing and liberating. The nitrogen conduit 21 is connected to the inlet 18d of the container 18 which is moved to the implementation position of step 4 and the miscellaneous gas conduit 24 is connected to the outlet 18e. Using the heater 185, the temperature within the container is controlled to a temperature at which component high-molecular gases are liberated from the object, specifically about 350° C. to 450° C., and this temperature is maintained long enough for substantially complete extraction of the high-molecular gas. Because the container 18 has an oxygen-free atmosphere and no internal combustion in it, and the miscellaneous gas conduit 24 is not open to the atmosphere, carbon dioxide, etc. are not generated from the liberated high-molecular gas. The gas containing the high-molecular gas liberated from the object in addition to nitrogen is delivered into the miscellaneous gas conduit 24 and recovered by the gas cooling device 11. The gas cooling device 11 cools the recovered gas independent of the gas recovered in other steps to obtain naphtha, which is equivalent to Heavy fuel oil A.

Step 4 is followed by step 5 for adhering carbon. The nitrogen conduit 21 is connected to the inlet 18d of the container 18 which is moved to the implementation position of step 5 and the miscellaneous gas conduit 24 is connected to the outlet 18e. Using the heater 185, the temperature is maintained at about 450° C. for a period of time sufficient for the adherence of carbon. Here, carbon dioxide and the like are not produced for the same reason as in the above description regarding step 4. The high-molecular gas recovered in this step is treated in the same manner as the high-molecular gas recovered in step 4.

Step 5 is followed by step 6 for cooling the product remaining in the container 18 after the treatment. A nitrogen conduit 21 from a nitrogen transport machine 16 is connected to the inlet 18d of the container 18 which is moved to the implementation position of step 6, the nitrogen conduit 21 from a cooling liquid nitrogen tank 17 is connected to the outlet 18e, and the heater 185 is turned off. While maintaining the air tight seal and oxygen-free atmosphere in the container 18, the inside of the container is cooled down to a temperature lower than the temperature at which carbon begins to burn by introducing low-temperature nitrogen gas from the cooling liquid nitrogen tank 17. When the temperature inside the container has cooled down to, for example, approximately 50° C. to 100° C., carbon in the container does not rapidly oxidize, even when the lid 182 is opened to expose the contents to the atmosphere. Because the object waste is not exposed to a high temperature at which the properties of metal are changed in any of the steps 1 to 6, the product remaining in the container 18 when step 6 is completed contains carbon which is not oxidized and metal with unchanged properties and can therefore be reused in its form at that time or recycled by a relatively simple additional treatment. It is also possible to separate and extract desired metal from the product remaining in the container using mass differences to sort the materials. The nitrogen used in this step can also be transported by the nitrogen transport machine 16 for reuse to the gas cooling device 11 through a nitrogen recycling conduit 25. Nitrogen gas may be introduced from the nitrogen gas generating device 9, which may replace the use of liquid nitrogen. Otherwise, the container 18 may be left standing sealed in an airtight state. The inside of the container 18 can be cooled down by simply leaving it for a sufficient time. Exposure to normal temperature is preferable for reducing the thermal stress applied to the container 18.

As described above, according to the preferred embodiment of the invention, the treatment is performed by a thermal decomposition process not involving combustion, so that reusable carbon can be obtained at the end of step 6 without producing carbon dioxide or sulfur oxide. Further, because heating is performed in an oxygen-free atmosphere and the temperature in the container 18 is not raised beyond approximately 450° C., the metal components in the object waste are not oxidized nor are their properties altered. These metals remain in the container 18 in a reusable state, and no heavy metals are dissipated. Further, no dioxins are produced because the object waste is exposed to temperatures sufficiently high to liberate chlorine and high-molecular compounds. According to measured results of object waste to which the present invention was applied, the amount of residual dioxins was $10^{-3}$ ng-TEQ/g (TEQ: toxicity equivalence quantity) or less, an amount which is substantially equal to zero. Because the temperature in the container 18 is merely raised to approximately 450° C., nitrogen oxide is not produced, regardless of heating in the atmosphere mainly containing nitrogen. Soot is not emitted because the object in the container is not burnt or stirred, and gases such as chlorine, high-molecular compounds, and the like produced in the treating process can be liquefied by the gas cooling device 11 for recycling. Most of the object waste is recycled, and the reclamation disposal or the like of the residue can be substantially eliminated.

Further, because the container 18 having the heater 185 is transportable, it is not necessary to install, maintain, or operate a furnace, and energy required for the treatment is reduced. As a result, advantageous effects such as reductions in the scale of equipment, installation space requirements, cost, and labor can all be obtained simultaneous with improvements in the efficient of recycling. For example, when the system is configured using the containers 18 having an inner diameter of approximately 500 mm, the amount of space required is only approximately 6 m×2 m, even when a relatively large interval I set between the adjacent containers. When the containers 18 have such dimensions, a relatively low power heater 185 can be used to heat the object waste to the target temperatures.

In a preferred embodiment of the present invention, the implementation location is divided into areas for individual steps, and pipelines are separately disposed for the individual implementation places as shown in FIG. 1 and FIG. 2. Thus, the number of pipeline connection ports (the inlet 18d and the outlet 18e in the above description) formed in the container 18 can be reduced, and the container 18 can be configured to be compact, simple, and low cost. Because the container 18 is moved from one step location to another, as in an assembly line, to perform a series of steps, a plurality of containers 18 can be treated simultaneously, and a waste treatment efficiency can be increased.

Alternatively, the present invention can be performed by determining a common location for the implementation of the first and second steps. This makes it possible to conduct the individual steps without moving the container, and all pipelines required for the first and second steps can be provided at one location. In a preferred embodiment of the present invention, it is necessary to measure a number of values, which complicates the configuration of the container and arrangement of the pipelines and conduits. Multiple pipeline connection ports may be provided in the container so that different ports are used for each step or each type of gas, or a valve may be formed on the side of the conduit arrangement so that a pipeline may be used in common, in multiple steps. This configuration realizes additional advantages in that it is not necessary to move the container, the space occupied by the treatment line can be reduced, and the like. In any case, it is to be understood that the system configurations shown in FIG. 1 and FIG. 2 and the container structure shown in FIG. 3 can be modified in various ways without impairing the basic advantages of the invention, and such various modifications are included in the scope of the present invention.

Figure 5:
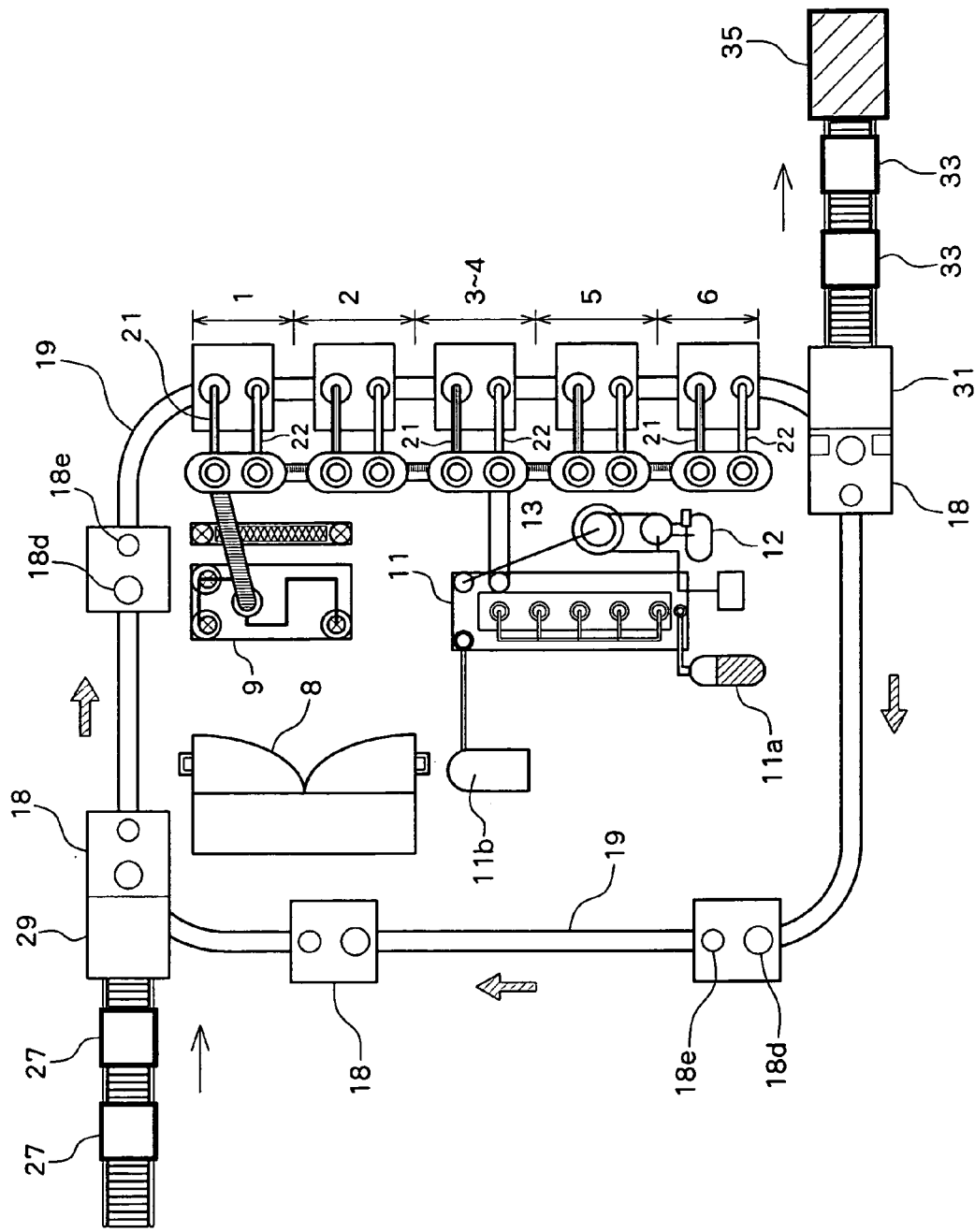
FIG. 5 is an explanatory diagram showing a structure of the carbon material manufacturing system according to another example of the invention, and particularly a schematic treating line and its incidental equipment.

Next, a method of producing inert carbon from scrap tires, rubber, vinyl, plastic and other petroleum and resin-based high-molecular compounds, and a method of producing carbon nanotubes and activated carbon by additional treatment of the obtained inert carbon, all using the carbon material manufacturing system of the present invention, will be described. FIG. 5 is an explanatory view showing a configuration of a carbon material manufacturing system according to an example of the embodiment of the invention, and particularly the outline of a treatment line and its incidental equipment. Each of the steps 1 to 6 is performed in substantially the same manner as the steps shown in FIG. 1 and FIG. 2, and the same reference numerals are given to the components of FIG. 5 which are identical to those shown in FIGS. 1 to FIG. 3.

First, a high-molecular compound which is an object 27 to be treated is put on a belt conveyor and conveyed to a container filling device 29. The container filling device 29 opens a square bottomed box container 18 with a side-opening lid to insert the object into it and closes the lid to seal the container 18. The container 18 is a side-opening lid type to allow inserting and discharging of the object 27 from the side of the container. Other configurations of forming the nitrogen gas inlet 18d and the gas outlet 18e on the top and having the heater 185 built in the inside wall are the same as those of the circular bottomed container 181 described above. The container 18 in which the object 27 is filled is moved to the first step along the track 19 for transporting the container 18.

In step 1, the inside of the container 18 is filled with a nitrogen atmosphere. Here, the nitrogen conduit 21 is connected to the inlet 18d, and the oxygen/vapor conduit 22 is connected to the outlet 18e. Nitrogen from the nitrogen generating device 9 is introduced into the container 18 through the inlet 18d via the nitrogen conduit 21. When the nitrogen is introduced into the container 18, air (oxygen) is discharged to the oxygen/vapor conduit 22 through the outlet 18e. Thus, the oxygen is removed, and the container 18 is filled with an oxygen-free nitrogen atmosphere.

The container 18 filled with the nitrogen atmosphere is moved to a second step for drying. In the second step, the nitrogen conduit 21 is connected to the inlet 18d, and the oxygen/vapor conduit 22 is connected to the outlet 18e. While preserving the nitrogen atmosphere, the built-in heater 185 is turned on to heat the insider of the container to approximately 150° C. This temperature is maintained until the container inside and the object 27 become dry.

The container 18, the insider of which was dried in step 2, is then moved to step 3 for liberating and extracting chlorine and step 4 for liberating and extracting a high-molecular compound. This is accomplished by moving the container 18 to the implementation locations of steps 3 and 4, where the nitrogen conduit 21 is connected to the inlet 18d and the chlorine/miscellaneous gas conduit 23 is connected to the outlet 18e. To switch between steps 3 and 4, the container 18 may be moved, but in the present example the operations of both steps are performed at the same location. Thus, the operation to move the container between steps 3 and 4 can be omitted.

In step 3 the heater is controlled to maintain a heating temperature in a range of 200° C. to 350° C. in order that the chlorine is vaporized and liberated from the object, but that high-molecular gas is not decomposed by heat. This temperature is maintained for a length of time sufficient for substantially complete extraction of chlorine. No dioxins are produced from the liberated chlorine because the container 18 has an oxygen-free atmosphere, there is no combustion, and the chlorine/miscellaneous gas conduit 23 is not open to the atmosphere.

Step 3 is followed by step 4. Control is performed such that the nitrogen conduit 21 is kept connected to the inlet 18d of the container 18 and the miscellaneous gas conduit 24 is kept connected to the outlet 18e as in step 3, the heating temperature by the heater 185 is a temperature, specifically 350° C. to 450° C., at which high-molecular gases are liberated from the object, and the temperature is maintained for a time sufficient for substantially complete extraction of the high-molecular gases. Carbon dioxide or the like is not produced from the liberated high-molecular gases because the container 18 has an oxygen-free atmosphere, combustion is not caused, and the miscellaneous gas conduit 24 is not open to the atmosphere.

Steps 3 and 4 are followed by step 5 for adhering carbon. The nitrogen conduit 21 is connected to the inlet 18d of the container 18 which is moved to the implementation place of step 5, and the miscellaneous gas conduit 24 is connected to the outlet 18e. The heater 185 is controlled so that the temperature remains within a range of 450° C. to 500° C. for a length of time sufficient to adhere carbon. At such a temperature, the object 27 has a high adhesion rate of carbon to provide inert carbon of superior quality. If the temperature becomes higher than that level, the carbon will have a small volume and may become stiff because this system operates in a nitrogen atmosphere or oxygen-free atmosphere, inert carbon can be obtained efficiently without an intermediate stage of activated carbon as a carbon material.

Step 5 is followed by step 6 for cooling the product remaining in the container 18. The heater 185 is turned off. In step 6, the container 18 is kept in a state isolated from the air and has the oxygen-free atmosphere in it, and low-temperature nitrogen gas is introduced from a cooling liquid nitrogen tank (not shown) to cool the container to a temperature lower than that at which carbon will burn. Thus, when the container 18 is cooled to, for example, approximately 50° C. to 100° C., the lid of the container 18 can be opened without oxidizing the carbon in the container. By cooling as described above, inert carbon (second product) 33 is obtained as a residue of the object 27

The container 18 containing the inert carbon 33 is moved to an acquisition device 31. The acquisition device 31 opens the lid of the container 18, retrieves the inert carbon 33, which is a residue of the object 27, from inside the container interior, and places the obtained inert carbon 33 on the conveyor belt at the exit. The container 18, which is now empty because the inert carbon 33 was removed, is put on the track 19 and again moved to the container filling device 29 to allow inserting a fresh object 27. The charged container 18 repeats the above-described steps and is refilled with an object by the container inserting device 29. Thus, a large amount of inert carbon 33 can be produced directly and inexpensively from the target material, without activated carbon, by continuous production based on the container flowing operation.

The obtained inert carbon can be treated by an inert carbon treating device 35 to produce activated carbon, carbon nanotubes, and other various carbon materials. For example, an activation treating device may be used as the inert carbon treating device 35 to treat the activated carbon. The inert carbon 33 removed from the acquisition device 31 by the belt conveyor is conveyed into the activation treating device 35. The inert carbon 33 placed in the activation treating device 35 can be activated with high-temperature vapor gas to obtain activated carbon. Meanwhile, a carbon nanotube manufacturing device is used as the inert carbon treating device 35 to produce carbon nanotubes as a carbon material. The manufacturing device may be a device capable of producing carbon nanotubes from the inert carbon, for example, a device using an arc discharge method, a laser vaporization method, a steam-activation method or the like, but such a device is not exclusive. For example, a method of producing carbon nanotubes using a carbon nanotube manufacturing device using an arc discharge method as the inert carbon treating device will be described. The inside of the carbon nanotube manufacturing device is filled with an inert gas, preferably helium. Here, the inert carbon 33 removed by the conveyor belt from the acquisition device 31 of FIG. 5 is conveyed into the carbon nanotube manufacturing device used as the inert carbon treating device 35. The inert carbon 33 is set as the anode in the carbon nanotube manufacturing device. After setting, a current of approximately 100A is passed between the inert carbon 3 and the cathode to cause an arc discharge. The inert carbon 33 as the anode is evaporated as carbon vapor by the arc discharge. The carbon vapor is directly condensed at the leading end of the cathode to become carbon nanotubes. Thus, carbon nanotubes are produced. The produced carbon nanotubes are often multilayer carbon nanotubes, but it is also possible to produce single-layer carbon nanotubes by including catalytic metals (e.g., Fe, Ni, Co, Y or La and its alloy) in the inert carbon 33 set as the anode.

As described above, a large amount of inert carbon 33 can be produced at a low cost from the object 27 by continuous production based on the capability of container flowing operation which is a feature of the invention. Therefore, the incorporation of the inert carbon treating device 35 into the present invention enables low-cost production of large quantities of high-quality activated carbon or carbon nanotubes.

INDUSTRIAL APPLICABILITY

The recycling method and system according to the present invention can efficiently perform low-cost recycling of wastes such as high-molecular compounds using small-scale equipment and without creating unnecessary or toxic waste. In other words, production of carbon dioxide, dioxin, or oxidized compounds during the treatment can be prevented, as can the corresponding environmental (air, soil, water, etc.) pollution. Thus, the present invention can realize contributions to society and the environment in addition to industrial applicability.

The carbon material manufacturing method and system of the invention can recycle high-molecular compounds to effectively produce inert carbon from the high-molecular compounds.

The carbon material manufacturing method and system of the present invention can recycle high-molecular compounds to produce inert carbon and can also produce from the produced inert carbon useful carbon materials such as carbon nanotubes and activated carbon in a large amount at a low cost by continuous production. Creation of a new industry can be expected based on the above large-scale, low-cost productivity. Use of carbon nanotubes, which were heretofore expensive and not commonly used in ordinary commodities, can be promoted, and their physical properties such as lightweight and high strength can be easily utilized for producing and enhancing those commodities.

Further, the container of the invention is easily handled when used for either the recycling method and system or the carbon material manufacturing method and system described above.

The invention claimed is:

1. A recycling method, comprising:
a first step of injecting inert gas through an inert gas supply apparatus into a container containing agricultural wastes as an object to be treated and replacing the atmosphere in the container with an oxygen-free atmosphere;
a second step of heating the object in the container to a temperature between the boiling temperature of water and 150° C. using a heater preinstalled in the container and controlling the heater so as to provide the temperature of about 150° C. for a period of time sufficient to substantially complete extraction of the water content of the object, while maintaining the oxygen-free atmosphere in the container in order to liberate vapor from the object, and guiding the liberated vapor as a first product to a device outside the container;
a third step of heating the object from which all water content has been extracted in the container to a temperature of about 200-350° C. using the heater preinstalled in the container while maintaining the oxygen-free atmosphere in the container in order to liberate chlorine from the object, and guiding the liberated chlorine gas to a device outside the container while maintaining the chlorine gas in a state isolated from the air to obtain the chlorine gas in a fluid state;
a fourth step of heating the object in the container to a temperature of no higher than 450° C. using the heater preinstalled in the container while maintaining the oxygen-free atmosphere in the container in order to liberate other gas from the object, and guide the liberated gas to a device outside the container while maintaining the gas in a state isolated from the air to obtain the gas in a fluid state;
a fifth step of maintaining the temperature in the container at no higher than 450° C. for a period of time sufficient for providing carbonized object while maintaining the oxygen-free atmosphere in the container; and
a sixth step of cooling the inside of the container to a temperature lower than the temperature at which carbonized object will burn while continuously maintaining the oxygen-free atmosphere in the container and obtaining a residue remaining in the container as a second product.

2. The recycling method according to claim 1, wherein:
a heating temperature of the object in each of the plurality of steps from the second step to the fourth step is determined so that the heating temperature in a following step is higher than that in the preceding step and according to the gas to be liberated in that step, and then the vapor liberating process is performed before the chlorine liberating process is performed; and
a guiding route and a guided destination for acquisition of the first product are separately determined for each of the plurality of processes performing the second step.

3. A recycling method according to claim 1, wherein:
the first step is performed with a first device for feeding at least a reducing gas or an inert gas connected to the container through a first pipeline;
the steps from the second step to the fourth step are performed with the first device connected to the container through the first pipeline and a second device as an outside device of the container connected to the container through a second pipeline; and
the container is placed in a sealed state when it is necessary to disconnect the pipeline between the container and the first or second device in order to move the container from one step to a next step.

4. A recycling method according to claim 3, wherein a different implementation location is determined for each step, and a pipeline required for implementation of each step at the individual implementation locations is extended to the implementation location so as to allow simultaneous treatment of a plurality of containers in an assembly-line method by sequentially moving the containers from one step to a next step.

5. A recycling system according to claim 3, wherein the implementation locations of at least the steps from the first step to the fourth step are designed to be a common location to enable the performance of at least the first and second steps without moving the container, and all pipelines required for the first and second steps are extended to said common location.

* * * * *